United States Patent

[11] 3,622,696

[72] Inventor Ernest C. Macintyre, Jr. Woodridge, Ill.
[21] Appl. No. 811,886
[22] Filed Apr. 1, 1969
[45] Patented Nov. 23, 1971
[73] Assignee Motorola, Inc. Franklin Park, Ill.

[54] AUTOMATIC CONTRAST CONTROL FOR A TELEVISION RECEIVER

7 Claims, 1 Drawing Fig.

[52] U.S. Cl. ........................................................ 178/7.5 DC, 178/7.5 R, 250/209, 250/217 SI
[51] Int. Cl. ........................................................ H04n 5/58
[50] Field of Search ........................................... 178/7.5 DC, 7.5 R; 250/209, 217 SI

[56] References Cited

UNITED STATES PATENTS

| | | | |
|---|---|---|---|
| 3,027,421 | 3/1962 | Heijligers | 178/7.5 |
| 3,147,341 | 9/1964 | Gibson | 178/7.5 |
| 3,165,582 | 1/1965 | Korda | 178/7.5 |
| 3,258,532 | 6/1966 | Loughlin et al. | 178/7.5 |
| 3,404,226 | 10/1968 | Szeremy et al. | 178/7.5 |

*Primary Examiner*—Richard Murray
*Assistant Examiner*—P. M. Pecori
*Attorney*—Mueller and Aichele ABSTRACT: A color television receiver using direct demodulation of the color and brightness signals supplies the output of the video amplifier stage through an automatic contrast control circuit including first and second light dependent resistors. The first light dependent resistor is subjected to the ambient light surrounding the receiver and operates in a voltage divider to provide a varying voltage in accordance with variations of the ambient light level. The output of the voltage divider is supplied through an integrating circuit to the base of a field effect transistor, the output of which is utilized to drive a lamp in an isolator package in which the second light dependent resistor is located. Variations of the light emanating from the lamp cause variations in the resistance of the second light dependent resistor, which is placed in series with the output of the video amplifier to variably attenuate the signals obtained therefrom to provide automatic contrast control.

In addition, there is disclosed an automatic brightness control circuit using a differential clipper one input to which supplied with a reference voltage and the other input to which is derived from the output of the green final amplifier stage to cause a comparison of the blackest-going signal during each trace interval. The output of the differential clipper is supplied to a second integrating circuit, the outpt of which is used to vary the DC operating level of the green, blue and red driver amplifiers to form a closed loop control system. Thus, the blackest level of the signal passing through the green amplifier stage is chosen as black for the brightness control circuit and the black level of the receiver is automatically adjusted accordingly.

PATENTED NOV 23 1971 3,622,696
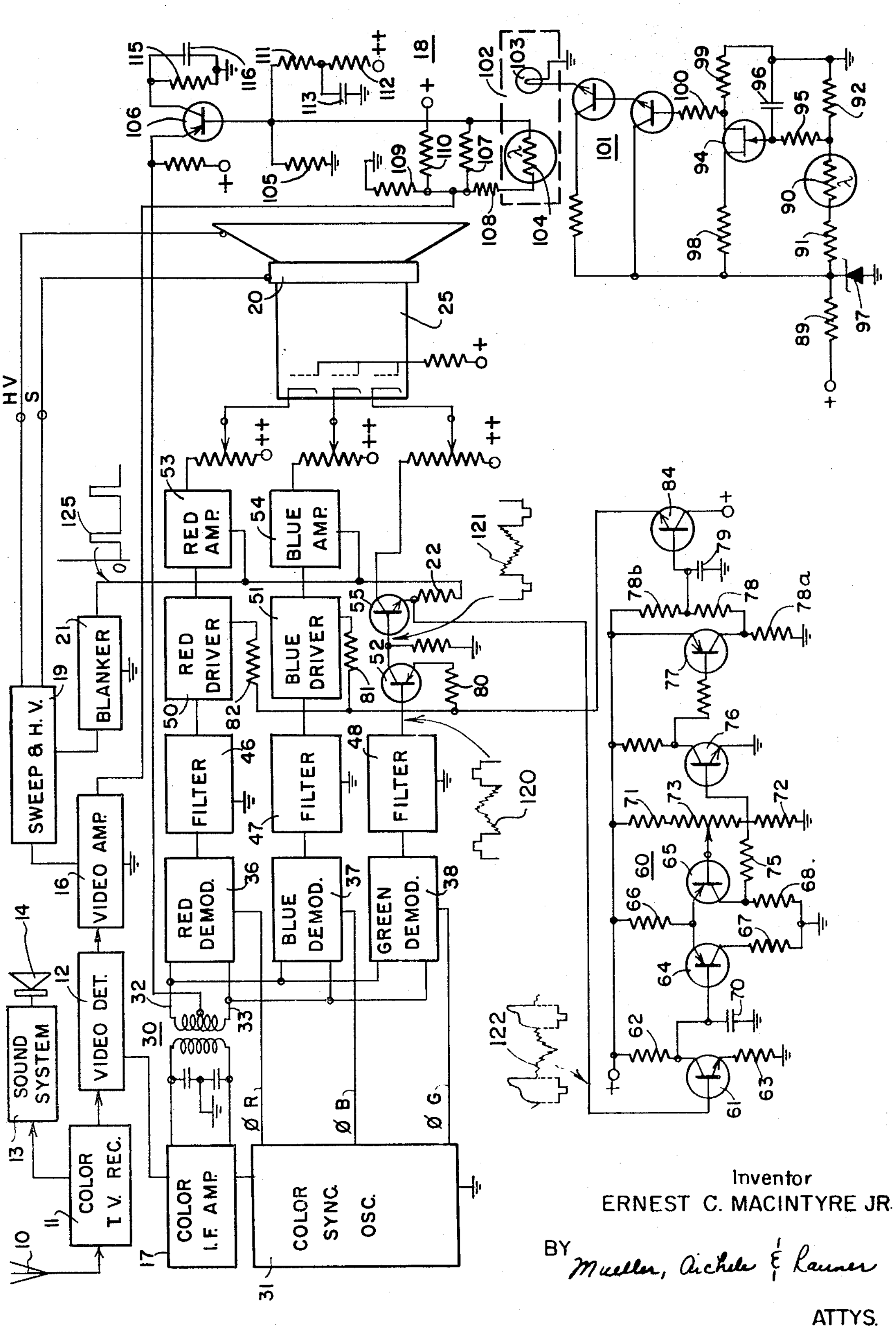
Inventor
ERNEST C. MACINTYRE JR.
BY Mueller, Aichele & Rauner
ATTYS.

AUTOMATIC CONTRAST CONTROL FOR A TELEVISION RECEIVER

BACKGROUND OF THE INVENTION

In most black and white and color television sets there is provided a manual control for adjusting the contrast and brightness settings of the receiver. This is necessitated by the fact that when the image on the face of the cathode-ray tube is viewed under different levels of ambient light conditions, the contrast and brightness settings of the receiver which may be be adequate for one particular ambient light condition are inadequate for other light conditions. For example, a contrast and brightness setting which is suitable for viewing a receiver located in a darkened room provides washed-out appearing images having inadequate contrast and brightness when the same receiver with these settings is placed in a highly illuminated room. Under the latter conditions it generally is necessary for the viewer to readjust manually the brightness and contrast controls in order to provide an acceptable image on the screen of the cathode-ray tube.

As a consequence, it is desirable to provide some means for automatically varying the contrast of a television receiver, and more particularly a color television receiver, by sensing the ambient light conditions to which the receiver is subjected and automatically adjusting the contrast accordingly. In the past, light dependent resistors subjected to the ambient light impinging upon the screen of the cathode-ray tube have been provided in place of or supplementing the conventional contrast potentiometer used at the output of the video amplifier stage.

A problem in the use of such light dependent resistors in the contrast circuit arises, however, inasmuch as these devices may be subject to relatively rapid changes of impedance with rapid changes of the ambient light levels, sometimes causing a step change in the contrast control output of which such devices are a part. This produces undesirable effects on the brightness settings of the receiver and may result in an unnecessary adjustment of the contrast due to a transient flash of light or sudden darkness condition which does not persist. As a consequence, it is desirable to provide for an automatic contrast control circuit responsive to ambient light conditions but which is not affected by changes in ambient light levels which are of a short duration.

SUMMARY OF THE INVENTION

Therefore, it is an object of this invention to provide an improved automatic contrast control circuit for television receivers.

It is another object of this invention to provide an improved automatic contrast control circuit responsive to changes in the ambient light level to which a television receiver is subjected.

It is a further object of this invention to provide an improved automatic contrast control circuit responsive to changes in the ambient light level in which the receiver is operated and which responds only to changes in the average ambient light level.

In accordance with a preferred embodiment of this invention, an automatic contrast control circuit includes a first light responsive device which is subjected to the ambient light impinging upon the television receiver to provide a varying output voltage corresponding to different ambient light levels. This varying output voltage controls a circuit which provides a variable impedance output corresponding to the variations in the voltage level obtained from the output of the first light responsive circuit. This variable impedance then is utilized to attenuate the signals obtained from the video amplifier in varying amounts corresponding to different ambient light conditions in which the receiver is operated.

In a more specific form, the varying voltage obtained from the first light responsive device is obtained from a voltage divider including a light dependent resistor. This voltage is passed through an integrating circuit which provides an output voltage which is indicative of the average brightness of the ambient light level and which operates to eliminate the affects of transient or short duration changes in the ambient light level. This voltage is supplied to a circuit for controlling the amount of current flowing through a lamp, the light from which impinges upon a second light dependent resistor which is used in the control circuit to variably attenuate the signals obtained from the video amplifier.

BRIEF DESCRIPTION OF THE DRAWING

The sole FIGURE of the drawing is a schematic diagram, partially in block form, of a preferred embodiment of the invention.

DETAILED DESCRIPTION

Referring now to the drawing, there is shown a color television receiver 11 coupled to a suitable antenna 10 for receiving a composite television signal and for selecting, amplifying, and converting the radio frequency signal to IF frequency for application to a video detector 12. The color television receiver 11 also is coupled to a sound system 13 which demodulates and amplifies the usual 4.5 mHz sound subcarrier for reproduction by a speaker 14 as the audio signals of the received composite signal supplied by the antenna 10 to the receiver 11.

The video detector 12 is coupled to a video amplifier 16 and a color IF amplifier 17, which are used to process the brightness and modulated chroma signal components of the received composite signals, respectively. The video amplifier 16 supplies signals to a sweep and high voltage circuit 19 which has an output connected to the deflection yoke 20 located on the neck of a three-gun color cathode-ray tube 25. The sweep and high-voltage system 19 also provides a high voltage for the screen of the shadow mask of the cathode-ray tube 25 in a conventional manner. In the color IF amplifier stage 17, there is a band pass filter network for selecting the color subcarrier at 3.58 mHz and its associated sidebands; and the amplifier 17 includes a gain or color intensity control to furnish a selected amplitude of the chroma subcarrier signal at opposite phases with respect to ground to the primary winding of an output transformer 30.

The output of the IF amplifier 17 also is further coupled to a color synchronizing oscillator 31 which selects the burst signals appearing on the "back porch" of the horizontal synchronizing pulses in order to develop a color reference signal of 3.58 mHz at three different phases for synchronous demodulation of the chroma or color signals. The three outputs of the oscillator 31 are identified as ΦR, ΦB and ΦG to designate the required phases for demodulating the red, blue and green colors of the modulated chroma signal components respectively.

The output of the video amplifier 16 also is supplied through an automatic contrast control circuit 18, the output of which is supplied to the center tap of the secondary winding of the transformer 30. The luminance or brightness signal obtained from the output of the automatic contrast control circuit 18 may extend in frequency up to or into the chroma subcarrier sidebands.

The secondary winding of the transformer 30 has one output lead 32 and a second output lead 33, with both of these leads carrying the same brightness component with respect to ground since it is applied to the center tap of the secondary winding of the transformer 30. The lead 32 carries the modulated chroma subcarrier of one phase, while the lead 33 carries the modulated chroma subcarrier of the opposite phase. These modulated chroma subcarrier signals are oppositely phased with respect to ground and are phase modulated to represent hue and are amplitude modulated to represent saturation. The leads 32 and 33 each are coupled to three direct color signal demodulators 36, 37 and 38. In addition the red, blue and green phase reference signals from the output of the color syncoscillator 31 are applied to the demodulators 36, 37 and 38, respectively, in order to provide direct demodulation of the signals applied to the inputs of these demodulators.

The outputs of the demodulators 36, 37 and 38 are supplied through associated filters 46, 47 and 48 which are provided to trap the 3.58 reference signal and pass the desired red, blue and green video output signals to three driver circuits 50, 51 and 52 respectively. Three amplifier circuits 53, 54 and 55 are driven by the outputs of the driver circuits and the output of each amplifier circuit is coupled through a variable resistor to the corresponding cathode of the three-beam cathode-ray tube 25. Associated grids of these cathodes are coupled to a suitable bias source and the tube 25 operates in accordance with well-known shadow mask principles to reproduce a monochrome or full color image in accordance with the video drive signals applied to it.

It is to be noted in conjunction with the foregoing description that the red and blue drivers 50, 51 and amplifiers 53, 54 have been shown in block form, whereas the green driver 52 and green output amplifier 55 are shown as PNP and NPN-transistors respectively. The output taken from the emitter of the video amplifier 55 is supplied to one input of a closed loop automatic brightness control circuit 60, the output of which then is supplied to the emitters of the driver transistors 50, 51 and 52 through suitable coupling resistors 80, 81 and 82 to vary the DC voltage supplied to the driver transistors 50, 51 and 52. This in turn varies the black level or brightness of the signal applied by the amplifiers 53, 54 and 55 to the corresponding cathodes in the cathode-ray tube 25.

In the receiver generally described so far, there may be additional circuitry which is known and which has not been disclosed in detail in order to simplify this disclosure. For example, there may be a gated automatic gain control system, a color killer system for interrupting the amplifier 17 in the absence of the color signal, as well as other circuitry now known in commercially produced color television receivers. It should further be noted that it is preferable for the video detector 12 to be direct current coupled through all of the succeeding amplifiers and demodulators directly to the cathodes of the picture tube 25, in order to maintain the DC component of the signals processed in the various translation paths.

In the operation of the color television receiver shown in the drawing, it is desirable to provide for an automatic contrast control responsive to the ambient light condition in which the receiver is operated. This is accomplished by the contrast control circuit 18 which includes a first light dependent resistor (LDR) 90 which is mounted to be subjected to the same ambient light which falls upon the viewing face or screen of the cathode-ray tube 25. The LDR 90 should be mounted, however, so as not to be subjected to the light emanating from the cathode-ray tube 25.

The LDR 90 is included as one element of a voltage divider consisting of an additional pair of resistors 91 and 92 connected in series with the LDR 90 between ground and a source of regulated positive potential, which appears across a zener diode 97 connected in series with a resistor 89 between a source of positive potential and ground. The junction between the LDR 90 and the resistor 92 provides a varying output voltage which varies in accordance with changes in resistance of the LDR 90 caused by changes in the ambient light conditions to which the LDR 90 is subjected. For low ambient light conditions, the resistance of the LDR 90 is high and the voltage obtained from the junction between the LDR 90 and the resistor 92 is relatively low. For high ambient light conditions, the resistance of the LDR 90 is relatively low, thereby causing the voltage obtained from the junction between the LDR 90 and the resistor 92 to be relatively high.

This varying voltage is applied to the gate of a field effect transistor 94 through an RC integrating circuit, consisting of a resistor 95 and a capacitor 96, to control the conduction of the transistor 94. The time constant of the integrating circuit 95, 96 is chosen to be relatively long, that is, of the order of 10 seconds to 10 minutes; so that sudden or transient changes in the ambient light conditions to which the LDR 90 is subjected have relatively little affect on the operation of the automatic contrast control circuit 18. The capacitor 96, operating in conjunction with the resistor 95, tends to level out all ambient light changes and to provide a voltage output which is indicative of only the average ambient light impinging upon the LDR 90.

The drain-source path of the field effect transistor 94 is supplied with regulated DC voltage from the voltage divider consisting of the resistor 89 and the zener diode 97 connected between a source of positive potential and ground. The source of the field effect transistor 94 is connected through a resistor 98 to the junction between the resistor 89 and zener diode 97 and the drain of the transistor 94 is connected through a resistor 99 to ground. the drain of the transistor 94 also is connected through a coupling resistance 100 to the input of a two-transistor Darlington amplifier circuit 101, with the emitter of the output transistor of the Darlington circuit 101 being connected in series with a lamp 103 included in a "rayistor" package 102. This package includes a light shield surrounding the lamp 103 and a second light dependent resistor (LDR) 104 located within the package 102.

As the conduction of the field effect transistor 94 varies, the conduction, in turn, of the output transistor of the Darlington pair 101 also varies correspondingly, causing a directly corresponding variation in the current flow through that transistor and the lamp 103 in the isolator package 102. Thus, the amount of light emitted by the lamp 103 varies in accordance with the average ambient light impinging upon the LDR 90. The light from the lamp 103 impinges upon the second light dependent resistor (LDR) 104 located within the isolator package, so that it is shielded from all other light sources. The resistance of the LDR 104 varies inversely with the amount of light impinging upon it, the more light impinging upon it, the lower its resistance and vice versa. The LDR 104 is located in series with a small resistor 108 between the output of the video amplifier 16 and one terminal of a fixed resistance 105, the other terminal of which is connected to ground. The junction between the LDR 104 and the resistor 105 is connected to the base of an emitter follower PNP-transistor 106, the emitter of which is coupled to the center tap of the secondary winding of the transformer 30 to apply the brightness signal components thereto.

When the resistance of the LDR 104 is low, indicating a high ambient light level since the resistance of the LDR 104 is low whenever the resistance of the LDR 90 also is low, the video signals applied across the series combination of the LDR 104, resistor 108, and the resistor 105 are divided so that the greatest portion thereof produces a voltage drop across the resistor 105. The resistor 105 is chosen to have a relatively high value of resistance, so that a maximum amount of the video brightness signal then is coupled by the emitter follower transistor 106 to the transformer 30. This is a desirable condition for a high ambient light level since maximum contrast is desired under such conditions.

Conversely, if a low ambient light level, such as would occur in a darkened room, is present, the impedance of the LDR 90 is high, causing reduced current to flow through the lamp 103, which in turn results in a high impedance being present in the LDR 104. In this type of situation, a greater amount of the video signal is dropped across the resistor 104 with a correspondingly lesser amount being dropped across the resistor 105 and is applied through the emitter follower 106 to the center tap of the secondary winding of the transformer 30. This produces reduced or low contrast, which is desirable for viewing in a darkened room or a darkened ambient light condition.

In order to set the minimum contrast which may be provided by the automatic contrast control circuit 18, a resistor 107 is connected in parallel with the LDR 104 and is chosen to have a valve to provide a predetermined minimum contrast whenever the resistance of the LDR 104 is extremely high or approaching infinity for a very dark ambient light condition.

In a similar manner, a limitation of the maximum contrast which may be provided by the contrast control circuit 18 is provided by the resistor 108 connected in series with the LDR 104; so that a predetermined minimum voltage drop occurs across the resistor 108 and LDR 104 even when the resistance of the LDR 104 approaches zero. This is done to limit the maximum contrast which may be supplied to the remainder of the circuitry of the television receiver to a safe level when it is being operated in a condition of high ambient light level. A voltage divider consisting of a pair of resistors 109 and 110 connected between ground and a source of positive potential has the junction between these resistors connected to the junction of the resistor 108 with the output of the video amplifier 16, in order to provide a predetermined DC operating level for the automatic contrast control circuit.

When a black level signal is present at the output of the video amplifier 16, the quiescent current bled through the LDR 104 is nulled by a voltage divider including a pair of resistors 111 and 112 connected between the junction of the resistor 105 with the base of the transistor 106 and a source of B++. The values of the resistors 111 and 112 are chosen to provide for this null at black signal levels, and a filter capacitor 113 is connected across the resistors 111 and 105 in order to filter out any ripple components in the B++ voltage supply.

The automatic contrast control circuit 18 is completed by providing a parallel combination of a resistor 115 and a capacitor 116 connected between the collector of the transistor 106 and ground. The resistor 115 is used to dissipate unnecessary power in the transistor 106, and the capacitor 116 is of such a value as to act as a roll-off filter for video frequency signals created by the resistor 115.

In operating a television receiver with an automatic contrast control circuit such as the circuit 18, it also may be desirable to provide for an automatic brightness control circuit. A suitable circuit which may be used to perform this function is the automatic brightness control circuit 60, which operates by monitoring the black-going signals obtained form the output of the green output amplifier 55 during the scan portions of the received signals and utilizes the blackest-going portion of the signals obtained during the scan intervals as being the black level. A closed loop is used to adjust the DC potential applied to the emitters of the red, blue and green video drive amplifiers 50, 51 and 52 accordingly, by comparing this blackest-going signal level with a preestablished reference signal.

This is accomplished in the circuit 60 by taking the output of the video amplifier 55 from the emitter and supplying this signal to the base of an NPN-transistor amplifier 61, which is supplied from a source of positive potential through a collector resistor 62, with the emitter being connected to ground through an emitter resistor 63. The collector of the amplifier transistor 61 is connected to the base of a PNP-transistor 64, connected in a differential clipper configuration with a PNP-transistor 65. The emitters of the transistors 64 and 65 are connected in common through an emitter resistor 66 to a source of positive potential and the collectors are each connected to ground through respective collector resistors 67 and 68.

In order to eliminate the effects of relatively high frequency transients in the signals obtained from the emitter of the transistor 55, an integrating or filter capacitor 70 is provided between ground and the junction of the collector of the transistor 61 with the base of the transistor 64. A reference bias level for the differential clipper is obtained from a voltage divider consisting of a pair of resistors 71 and 72 and a potentiometer 73, with the potentiometer being located between the resistors 71 and 72. The resistors 71 and 72 provide for the maximum and minimum settings of the brightness reference signal level which can be obtained by adjustment of the potentiometer 73, and the tap of the potentiometer 73 is connected to the base of the transistor 65 to provide a DC reference level for the operation of the differential clipper.

Assume for the moment that a predetermined DC reference level, which is chosen by the viewer to be the black reference level, is set on the potentiometer 73 providing a preestablished base bias for the transistor 65. During the operation of the television receiver a composite signal 120 is applied to the base of the green video driver transistor 52, and this signal is inverted by the transistor 52 to attain the form of the signal 121 which is applied to the green amplifier transistor 55. This signal in turn then is applied from the emitter of the transistor 55 in the form of the composite signal 122 to the base of the transistor 61, with the black-going portions of the signal tending to bias the base of the transistor 61 more negatively, thereby reducing its conductivity, which in turn causes the potential on its collector to rise. On the other hand, for white-going signals the transistor 61 is supplied with a relatively positive biasing potential on its base rendering it more conductive, reducing the potential on its collector. In conjunction with this description it should be noted that during the trace interval the output from a blanker circuit 21, supplied with input signals from the sweep and high-voltage circuit 19, is normally at ground potential and is applied to the emitter of the transistor 55 through a coupling resistor 22.

Whenever the voltage applied to the base of the transistor 64 becomes more positive than the reference potential applied to the base of the transistor 65, the PNP-transistor 64 is cutoff and the transistor 65 conducts, causing a relatively positive potential to be coupled through a coupling resistor 75 to the base of an NPN-amplifier transistor 76. A positive output signal obtained from the collector of the transistor 65 renders the transistor 76 more conductive, which causes a PNP-transistor 77 to be rendered more conductive, providing a charging path toward B+ through a resistor 78 for a capacitor 79 in an integrating circuit, to raise the potential on the base of an NPN emitter-follower transistor 84. This causes the transistor 84 to supply a more positive DC potential to the emitters of the transistors 50, 51 and 52 which causes the back level or brightness of the television receiver to be raised correspondingly During white information in the received signal, the transistor 77 is rendered nonconductive and the capacitor 79 is discharged toward ground in a like manner through resistors 78 and 78*a*, causing the transistor 84 to lower the voltage on the emitters of the transistors 50, 51 and 52 which causes these driver transistors to reduce the drive to the output transistors 53, 54 and 55 thereby decreasing the beam intensity or brightness.

It should be noted that this system continuously drifts toward black, and that the brightness control system is kicked back toward the white level by black-going signals. A resistor 78*b* in series with the resistors 78 and 78*a* provides the white level limit to which the capacitor 79 can be charged. During blanking intervals, a positive blanking pulse 125 is applied to the emitter resistor 22 of the green amplifier 55 and to similar resistors in the red and blue amplifiers 53 and 54 to cutoff the output video amplifiers. This blanking pulse is of sufficient magnitude to override the signals which otherwise would appear on the emitter of the transistor 55 during the blanking interval and appears as white-going information at the base of the transistor 61, as can be ascertained by the solid line portions of the waveform 122.

It should be noted that the brightness control circuit 60 monitors the video signal between the blanking intervals and does not rely upon the signals present during the synchronizing and blanking intervals as is commonly done. As a consequence, the system chooses the most black-going video signal level as the black reference point and adjusts the brightness of the television receiver accordingly. The brightness control circuit 60 is rendered operative by the output of the green video amplifier 55 because the output of the green channel is most like the black and white signal. It should be noted that if it were so desired, the brightness control circuit 60 could monitor the outputs of all three output amplifiers 53, 54 and 55 which could be matrixed together in an OR gate circuit; so that the blackest-going signal obtained from any one of the three channels would be utilized as the control signal. It has been found, however, that adequate brightness control can be obtained by monitoring only the green channel, so that such a matrixing is not necessary.

In conjunction with the automatic contrast control circuit 18, it should be noted that the LDR 90 does not have any AC or video signals passing through it, so that the location of this resistor with respect to the signal carrying portion of the receiver is not critical. As a consequence, it may be mounted near the front of the television receiver with the DC control signals obtained from it being supplied to the interior of the receiver where the rayistor 102, including the lamp 103 and the LDR 104 may be located in a position adjacent the signal carrying video amplifier circuit 16. The automatic contrast control circuit is entirely independent of any AGC circuit which may be included in the receiver and does not add any DC components into the signals present in the receiver to interfere with the proper operation of the brightness control circuit. The automatic contrast control and the brightness control circuit are relatively independent of one another which is a desirable condition in a DC coupled receiver.

The use of the two light dependent resistors 90 and 104 has provided a means for delaying the response to changes in ambient light input in a manner so that the ambient light changes are effectively integrated in order to prevent sudden or transient light changes from having an adverse affect on the automatic control circuit. What is accomplished by means of the circuit utilized in the automatic contrast control circuit 18 is more or less a light-to-resistance-to-voltage-to-resistance conversion circuit, providing the desirability of a time delay or integration feature which is possible with voltage control along with the variable resistance which is required to vary the attenuation of the video signals obtained from the video amplifier 16 in accordance with changes in the ambient light conditions.

I claim:

1. In a television receiver comprising a cathode-ray tube, a source of video signals, and a circuit including a video amplifier for coupling the source of video signals to the cathode-ray tube including in combination:

light responsive means for providing an output voltage indicative of the amount of ambient light impinging on said light responsive means, said light responsive means being physically located to receive ambient light impinging upon the television receiver;

a field-effect transistor having at least a gate electrode and an output electrode, with the gate electrode coupled to receive the output voltage from said light responsive means;

a lamp;

means coupling the output electrode of said field-effect transistor in series with said lamp to vary the intensity of the light produced by said lamp in accordance with variations in the conductivity of the field-effect transistor;

a light dependent resistor located to receive only the light emanating from said lamp, with the resistance of said light dependent resistor varying in accordance with the light impinging 01 thereon; and means coupling said light dependent resistor in series circuit with said video amplifier so that the signals obtained from the output of said video amplifier are attenuated in accordance with the resistance of said light dependent resistor.

2. The combination according to claim 15 wherein the light responsive means includes a voltage divider connected across a source of DC potential, with at least a portion of the voltage divider being in the form of a second light dependent resistor.

3. The combination according to claim 1 further including an integrating time delay circuit coupled between the light responsive means and the gate of the field-effect transistor.

4. The combination according to claim 2 further including a resistance-capacitance integrating circuit connected between the output of said voltage divider and the gate of said field-effect transistor.

5. In a television receiver having a cathode-ray tube, a source of video signals comprising at least brightness components and a circuit including a video amplifier for coupling the brightness signal components to the cathode-ray tube, an automatic contrast control circuit for the brightness components of the video signal including in combination:

a first light dependent resistor connected in a voltage divider circuit connected across a source of DC potential and physically located to be responsive to the ambient light impinging upon the television receiver;

a voltage variable conductive device connected in series with a source of DC potential;

circuit means coupling an output on the voltage divider to the voltage variable conductive device for controlling the conduction thereof;

a lamp connected in series with the variable conductive device for receiving varying amounts of current therefrom to produce a varying intensity of light in accordance with the amount of current flowing therethrough;

a second light dependent resistor arranged to be illuminated only by the light emanating from the lamp; and means connecting the second light dependent resistor in series with the video amplifier for attenuating the output of the video amplifier.

6. The combination according to claim 5 wherein the lamp and the second light dependent resistor both constitute parts of a light shielded isolator package and are electrically isolated from one another.

7. The combination according to claim 5 further including an integrating circuit included in the circuit means for controlling the conduction of the variable conductive device, said integrating circuit operating to cause said control to be responsive only to the average intensity of the ambient light impinging upon the first light dependent resistor.

* * * * *